United States Patent
Shim

[19]

[11] Patent Number: 6,020,694

[45] Date of Patent: Feb. 1, 2000

[54] HORIZONTAL SIZE REGULATION CIRCUIT OF DISPLAY DEVICE

[75] Inventor: Jae-Gyou Shim, Suwon-si, Rep. of Korea

[73] Assignee: SamSung Electronics Co., Ltd., Suwon, Rep. of Korea

[21] Appl. No.: 09/050,177

[22] Filed: Mar. 30, 1998

[30] Foreign Application Priority Data

Mar. 28, 1997 [KR] Rep. of Korea ...................... 97-10983

[51] Int. Cl.$^7$ .............................. H01J 29/56; G09G 1/04
[52] U.S. Cl. ........................... 315/387; 315/370; 315/399
[58] Field of Search ...................................... 315/370, 371, 315/387, 389, 399, 408, 411; 348/806

[56] References Cited

U.S. PATENT DOCUMENTS

| | | |
|---|---|---|
| 4,063,133 | 12/1977 | Nero et al. ............................. 315/370 |
| 4,263,615 | 4/1981 | Steinmetz et al. . |
| 4,559,481 | 12/1985 | Dietz ....................................... 315/411 |
| 5,438,245 | 8/1995 | Kii et al. . |
| 5,625,261 | 4/1997 | Ogawa ................................... 315/411 |
| 5,831,398 | 11/1998 | Kim ....................................... 315/371 |

*Primary Examiner*—Edward P. Westin
*Assistant Examiner*—Nikita Wells
*Attorney, Agent, or Firm*—Robert E. Bushnell, Esq.

[57] ABSTRACT

A horizontal size regulation circuit of a horizontal deflection circuit of a display device maintains a constant horizontal size despite transformer manufacturing tolerances, by using a horizontal flyback output value fed back from a choke coil of a horizontal output circuit. A voltage supplied to a switching element providing current to a horizontal output transistor is sensed according to the duty cycle output from a horizontal size controller. A voltage detector incorporated into the horizontal deflection circuit controls the value fed back to the horizontal size controller according to the variation of the voltage supplied to the switching element.

10 Claims, 4 Drawing Sheets

HORIZONTAL SIZE REGULATION CIRCUIT OF DISPLAY DEVICE

CLAIM FOR PRIORITY

This application makes reference to, incorporates the same herein, and claims all benefits accruing under 35 U.S.C. §119 from an application for HORIZONTAL SIZE REGULATION CIRCUIT OF DISPLAY DEVICE earlier filed in the Korean Industrial Property Office on the 28$^{th}$ of Mar. 1997, and there duly assigned Ser. No. 10983/1997, a copy of which application is annexed hereto.

BACKGROUND OF THE INVENTION

1. Technical Field

The present invention relates to a display device and, more particularly, to a horizontal size regulation circuit of a display device which regulates the voltage applied to a deflection coil of a horizontal output circuit in a horizontal deflection circuit of the display device, using the switching operation of an active element, to maintain a specific horizontal size.

2. Related Art

Generally, a display device such as a CRT type of monitor is a peripheral device which processes information data received from an information data system such as a computer system and provides a visual display of the processed information data on a screen. In all display devices, a video card which is installed in the information data system, outputs a video signal in accordance with vertical and horizontal synchronous signals for a visual display. The vertical and horizontal synchronous signals exhibit different frequencies according to different operation modes of the video card. When the operation mode of the video card in the computer system is changed to display a desired signal on the screen of the display device, the display device discriminates the changed operation mode on the basis of the frequencies of the vertical and horizontal synchronous signals from the video card, and provides a visual display in accordance with the discriminated operation mode.

A conventional display device generally includes a microprocessor which receives the vertical and horizontal synchronous signals from the video card to control the visual display of information data on a screen, and vertical and horizontal deflection circuits which respectively receive the vertical and horizontal synchronous signals to perform vertical and horizontal deflection, such that an electron beam generated by an electron gun of a cathode ray tube (CRT) is deflected in a regular sequence from an upper left portion to a lower right portion of the CRT by way of a deflection yoke in order to form an image. A high voltage generating circuit, such as that disclosed in U.S. Pat. No. 5,438,245 for High Voltage Generating Circuit issued to Kii et al., is included to stably supply a high voltage to the anode of the CRT in response to a flyback pulse generated by the horizontal deflection circuit. Video amplifiers then serve to amplify an RGB video signal transmitted from the video card to a level of approximately 40–60 Vpp for providing energy to each pixel.

In such a display device, deflection circuits perform either an electrostatic deflection using an electric field or an electromagnetic deflection using a magnetic field. As a result, an image is formed on the CRT monitor from the electron beam projected onto a fluorescent surface thereof by outputting a sawtooth current waveform to horizontal and vertical coils. An example of such a horizontal deflection circuit is disclosed in U.S. Pat. No. 4,263,615 for Horizontal Drive Circuit For Video Display issued to Steinmetz et al. Generally, the horizontal deflection circuit includes a horizontal drive circuit and a horizontal deflection output circuit, for generating an output horizontal deflection signal outputted to a deflection yoke mounted on the CRT. The horizontal deflection output circuit typically includes a transformer for amplifying a horizontal drive signal and a horizontal output transistor which operates in response to an output of the transformer to generate an output horizontal deflection signal.

A contemporary horizontal deflection circuit, as I have observed however, often fails to effectively regulate the horizontal voltage supplied to the deflection coil of the horizontal output circuit. As a result, errors in the horizontal size regulation may be severe, resulting in deterioration of the stability of the circuit and distortion of the displayed image.

SUMMARY OF THE INVENTION

Accordingly, it is therefore an object of the present invention to provide an improved display device.

It is also an object to provide a display device capable of removing errors in horizontal size regulation for stable operation.

It is another object to provide a display device having a horizontal size regulation circuit for removing errors in horizontal size regulation according to a manufacturing tolerance of the transformer of a horizontal output circuit.

It is yet another objective to provide a display device having a horizontal size regulation circuit for maintaining a specific horizontal size.

These and other objects of the present invention can be achieved by a horizontal size regulation circuit of a display device which comprises a microcomputer for generating a control signal for regulating the horizontal display size of an image displayed on a screen; a horizontal output circuit having a choke coil for generating a current output to a deflection coil according to a horizontal deflection signal; a horizontal size controller for controlling the horizontal display size in accordance with the control signal; a current controller for controlling the amount of current supplied by the horizontal size controller to the horizontal output circuit; voltage detector for detecting the voltage supplied to a switching device of the current controller; and a feedback controller for controlling the amount of a feedback voltage supplied to said horizontal size controller, by filtering the voltage detected by the voltage detector.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
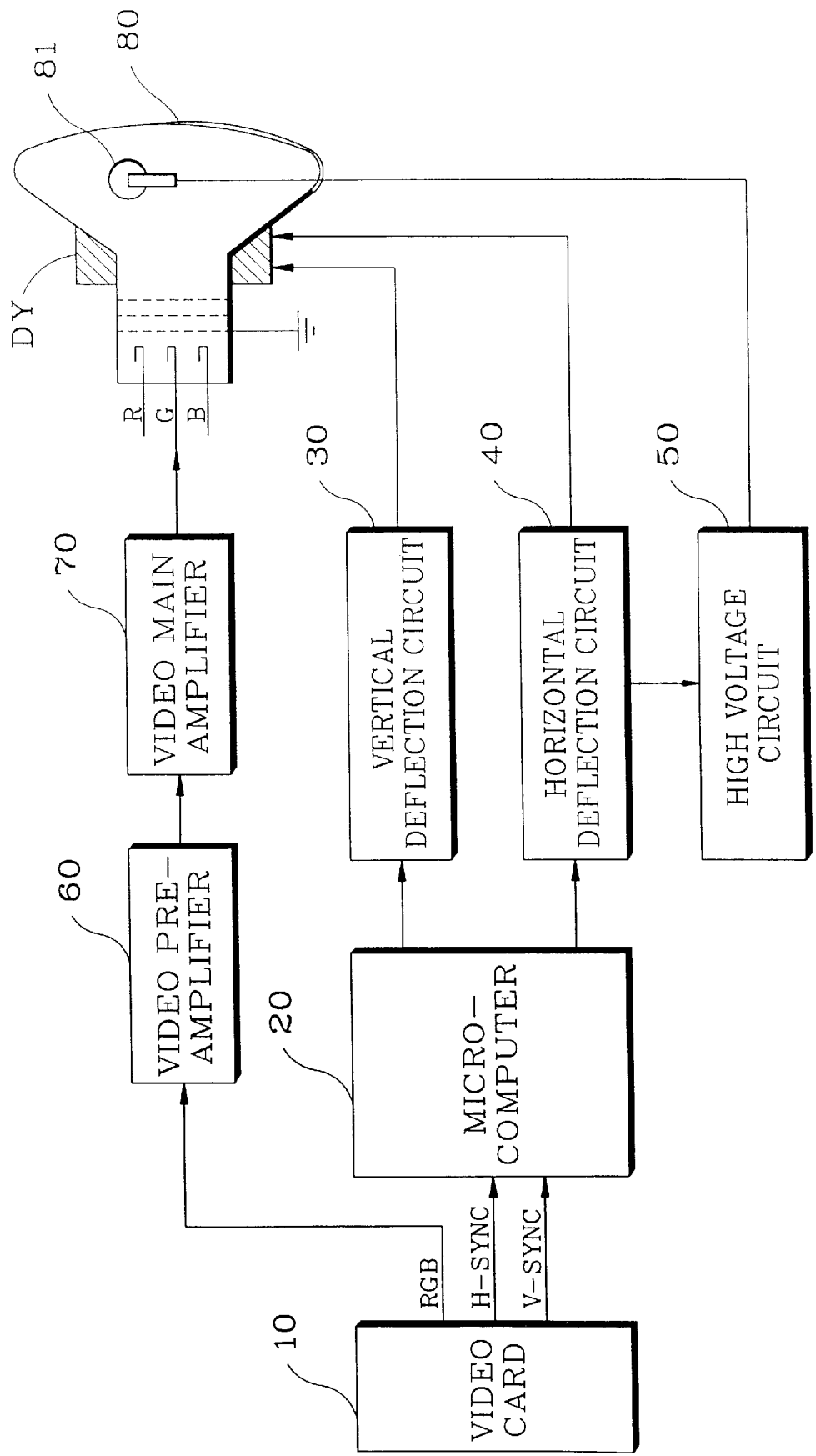
FIG. 1 is a block diagram of an exemplary display device.

Referring now to the drawings and particularly to FIG. 1, an exemplary display device such as a CRT for providing a visual display of information data on a screen is illustrated. The display device includes a video card 10 installed within a computer system (not shown) to supply an RGB video signal and horizontal/vertical synchronization signals H-SYNC and V-SYNC required for image formation. A microcomputer 20 receives the horizontal/vertical synchronization signals H-SYNC and V-SYNC from the video card 10 to thereby generate a screen control signal for controlling the screen of a monitor. Vertical and horizontal deflection circuits 30 and 40 respectively receive the vertical/horizontal synchronization signals V-SYNC and H-SYNC, and respectively perform vertical and horizontal deflection, such that an electron beam generated by an electron gun of a CRT 80 is deflected in regular sequence from an upper left portion to a lower right portion of the CRT 80 by means of a deflection yoke DY to thereby form an image. A high voltage circuit 50 utilizes a flyback pulse generated from an output terminal of the horizontal deflection circuit 40 to thereby provide a high voltage to an anode 81 of the CRT 80. A video preamplifier 60 amplifies the RGB video signal output from the video card 10, to thereby hold a predetermined voltage level for amplification by a video main amplifier 70 in order to supply the amplified video signal to each pixel at a level of approximately 40–60 Vpp.

Figure 2:
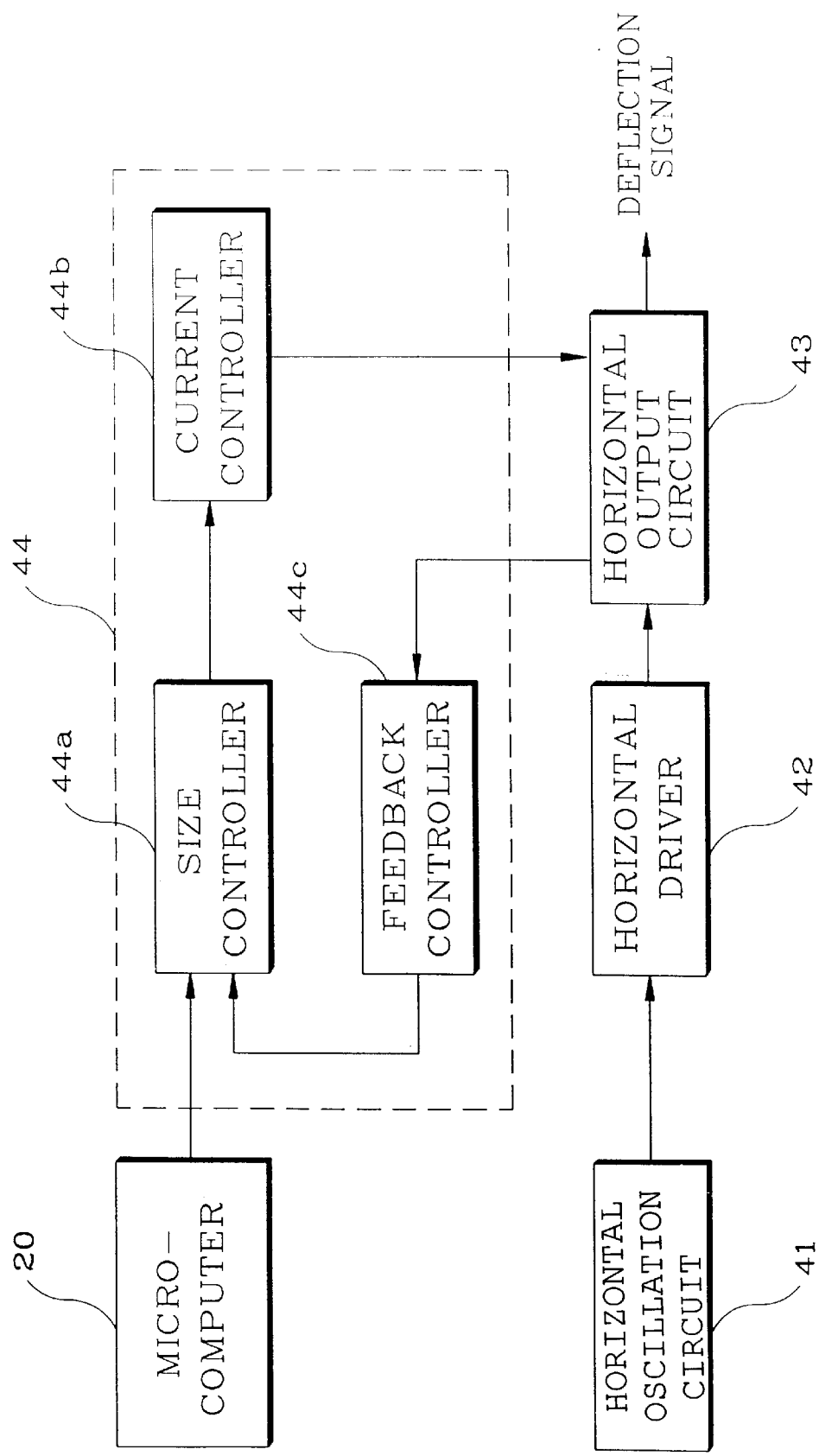
FIG. 2 is a block diagram of a horizontal deflection circuit of a conventional display device.

FIG. 2 illustrates a construction of the horizontal deflection circuit of a conventional display device. In such a construction, the horizontal deflection circuit 40, which includes a horizontal oscillation circuit 41, a horizontal driver 42 and a horizontal output circuit 43, serves to output a horizontal signal to a deflection yoke DY. A horizontal size regulation circuit 44 is connected to horizontal output circuit 43 to maintain a specific horizontal size of the image displayed on the display device.

The horizontal oscillation circuit 41 outputs a sawtooth waveform according to a charging/discharging characteristic of a capacitive circuit oscillating at a horizontal frequency. The horizontal driver 42 employs a one-stage or a two-stage current driver using a transistor or a field effect transistor to amplify an output pulse of the horizontal oscillation circuit 41, and thus supplies a base current sufficient to switch a horizontal output transistor while performing waveform correction. The horizontal deflection output circuit 43 outputs a sawtooth current waveform through the horizontal deflection yoke in accordance with a switching operation of the horizontal output transistor to which the sufficient current from the horizontal drive circuit 42 is supplied.

The horizontal size regulation circuit 44 relies on the microcomputer 20 to generate a horizontal size control signal, and includes a size controller 44a for controlling the horizontal size according to the control signal generated by microcomputer 20, a current controller 44b for controlling the amount of current which flows through a transformer of the horizontal output circuit 43, and a feedback controller 44c for sensing a horizontal flyback pulse from the transformer of the horizontal output circuit 43 and providing the size controller 44a with the sensed horizontal flyback pulse.

Figure 3:
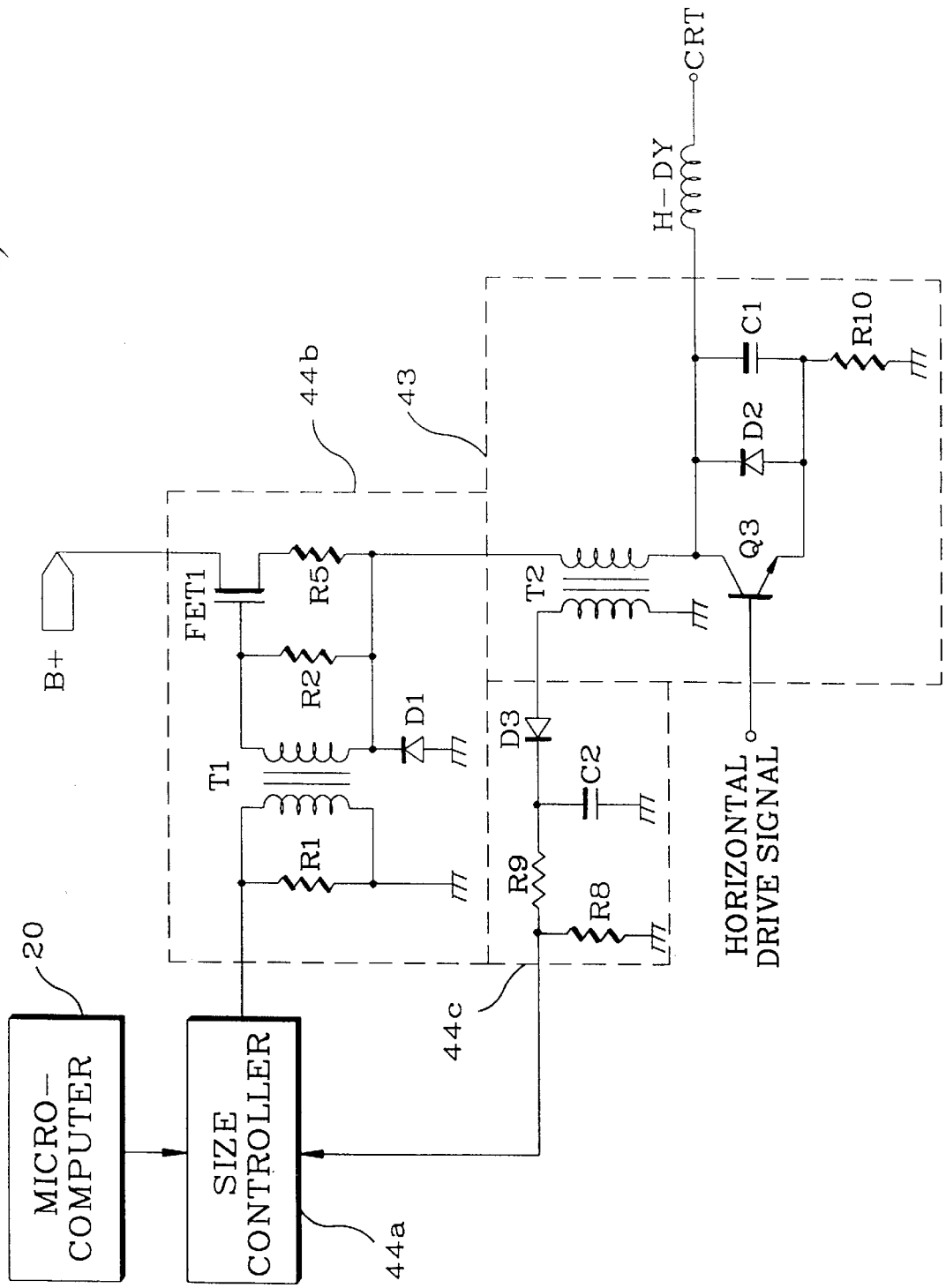
FIG. 3 is a schematic diagram of a horizontal size regulation circuit of the horizontal deflection circuit shown in FIG. 2.

FIG. 3 illustrates detailed configurations of the horizontal output circuit 43 and horizontal size regulation circuit 44.

Current controller 44b comprises a resistor R1 for detecting the output signal of size controller 44a, a transformer T1 for inducing the voltage of the output signal to the following stage, and a field effect transistor FET1 for receiving the induced voltage at its gate, to control, using its source current, the amount of current provided to a transformer T2 of the horizontal output circuit 43. The feedback controller 44c consists of a diode D3 for sensing the horizontal flyback pulse voltage from transformer T2 of the horizontal output circuit 43, a smoothing capacitor C2 and resistors R8 and R9 for transmitting the sensed voltage to the size controller 44a.

The operation of the conventional horizontal size regulation circuit will now be described with reference to FIGS. 1 to 3.

The duty cycle (on/off time) of field effect transistor FET1 connected to the secondary side of transformer T1 is controlled according to a pulse width regulation signal output from the size controller 44a. That is, the transistor FET1 is turned on during the "on" time of a pulse supplied from transformer T1 and turned off during its "off" time. Accordingly, transformer T2 which receives current through the source of transistor FET1, is charging when transistor FET1 is turned on and is discharging when transistor FET1 is turned off, thereby generating the horizontal flyback pulse. In this case a size regulation voltage is fed back from the transformer T2, to control a horizontal size of a displayed image. Thus, errors in the size regulation may be severe according to the transformer's manufacturing tolerances, to produce overly larger horizontal size differentials, resulting in a deterioration of the stability of the circuit.

Figure 4:
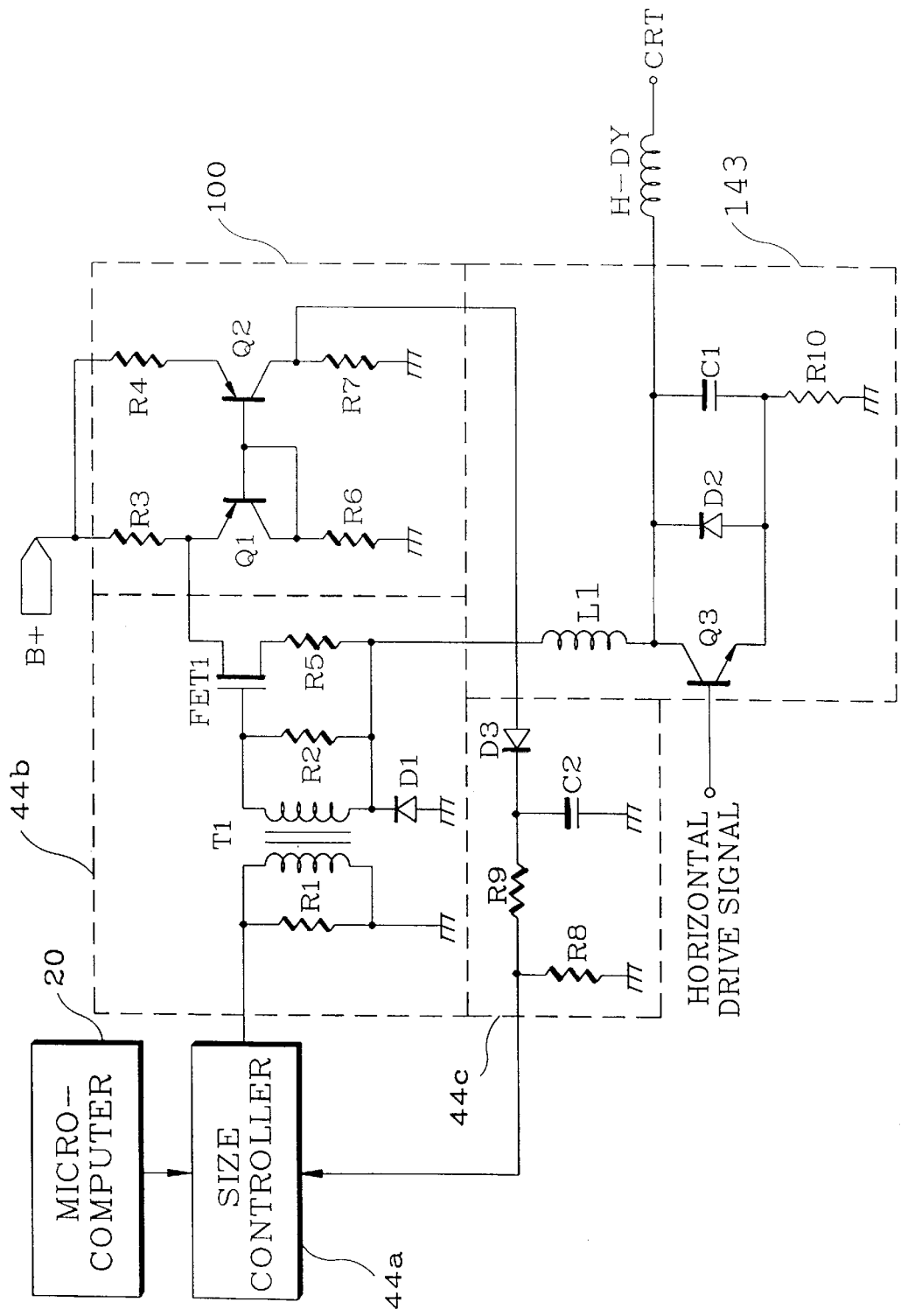
FIG. 4 is a schematic diagram of a horizontal deflection circuit using a horizontal size regulation circuit constructed according to the principles of the present invention.

FIG. 4, illustrates a horizontal deflection circuit using a horizontal size regulation circuit for regulating a horizontal size of an image according to the principles of the present invention. The voltage feedback of the horizontal deflection circuit is not effected at the coil of the horizontal output circuit, in contrast to the circuit shown in FIG. 3. In the circuit of FIG. 4, a voltage detector 100 is connected to the output of current controller 44b. The voltage detector 100 is turned on/off according to the level of voltage supplied from horizontal size controller 44a to a switching element, i.e., field effect transistor FET1, of current controller 44b, to control a feedback value supplied from feedback controller 44c to horizontal size controller 44a.

The voltage detector 100 is comprised of two active elements. In a preferred configuration of the voltage detector 100, the emitter of a first transistor Q1 senses a voltage at the drain of switching element FET1, and its collector is grounded via a resistor R6. The base of the first transistor Q1 is connected to the base of a second transistor Q2. A bias voltage is supplied to the emitter of second transistor Q2 through a resistor R4, and its collector is grounded via a resistor R7. The voltage level fed back to the horizontal size controller depends on the level of voltage of the collector of the second transistor Q2. That is, the collector of the second transistor Q2 is connected to the anode of a diode D3 of the feedback controller 44c.

The operation of the horizontal size regulation circuit for regulating a horizontal size of a displayed image according to the present invention will now be described hereinbelow.

The output of the horizontal size controller 44a is fed to the primary of transformer T1 which is parallel with resistor R1. The induced pulse of transformer T1 turns on/off transistor FET1. The transistor FET1 supplies current to a horizontal output transistor Q3 through a coil L1 of a horizontal output circuit 143 during the "on" time of the pulse, thereby performing current control. The coil L1 is charged during the "on" time of transistor FET1, and is discharged during its "off" time. This generates a horizontal flyback pulse. Horizontal output transistor Q3 provides a horizontal deflection coil H-DY with current. A damping diode D2 forms a loop for discharging energy charged at a resonance capacitor C1 during the "on" time of horizontal output transistor Q3.

Meanwhile, the voltage at the drain of the transistor FET1 is sensed by the emitter of the first transistor Q1 of the voltage detector 100. When this voltage is high, the amount of current flowing through the emitter of the first transistor Q1 increases, resulting in an increase in the voltage sensed by the resistor R6 connected to the collector of the first transistor Q1. The increase in the voltage supplied to resistor R6 causes the voltage of the base of the second transistor Q2 to rise, resulting in an increase in the base-to-collector voltage ($V_{BC}$) across the base and collector of the second transistor Q2. Accordingly, the emitter current of second transistor Q2 is reduced, thereby decreasing the amount of current at its collector.

The decrease in the amount of current which flows through resistor R7 connected to the collector of the second transistor Q2 is the direct result of the reduction in voltage supplied to resistor R7. The decreased voltage is fed back to the size controller 44*a* by way of the feedback controller 44*c*. The voltage sensed by the resistor R7 is filtered by diode D3 and capacitor C2, and divided by resistors R8 and R9, serving as a pulse-width-modulation (PWM) control value of the horizontal size controller 44*a*. When the voltage fed back to the horizontal size controller 44*a* is reduced, the horizontal size controller 44*a* increases the duty cycle ratio and outputs the increased value. The increased duty cycle pulse is sent to transistor FET1, increasing the "on" time of the pulse. The increased duty cycle augments the amount of current provided to horizontal output transistor Q3, enlarging the horizontal size of a displayed image. If the voltage, sensed and fed back by resistor R7 is increased, the output of the horizontal size controller 44*a* decreases the duty cycle in order to reduce the horizontal size of a displayed image. As described above, continuous feedback can maintain a specific horizontal size of a displayed image.

According to the present invention, it is possible to reduce the horizontal size difference which may be created according to the difference in choke coil tolerance because the feedback voltage of the voltage controller of the horizontal output circuit is not sensed by the horizontal deflection transformer. Therefore, a display device having stable quality can be fabricated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A horizontal size regulation circuit of a display device, comprising:

a microcontroller for generating a control signal for regulating a horizontal display size of an image displayed on a screen;

a horizontal output circuit including a choke coil for generating a current output to a deflection coil according to a horizontal deflection signal;

a horizontal size controller for controlling the horizontal display size in accordance with the control signal;

a current controller for controlling current supplied from said horizontal size controller to said horizontal output circuit;

a voltage detector for detecting a voltage supplied to a switching element of said current controller; and a feedback controller for controlling a feedback voltage supplied to said horizontal size controller, by filtering the voltage detected by said voltage detector.

2. The horizontal size regulation circuit of claim 1, current supplied to said choke coil of said horizontal output circuit being controlled in accordance with an output signal of said current controller.

3. The horizontal size regulation circuit of claim 1, said horizontal output circuit comprising:

said choke coil receiving current supplied from the current controller; and an output transistor having a base coupled to receive a horizontal drive signal and a collector connected to said choke coil for generating the current output to the deflection coil to cause the deflection coil to generate a horizontal deflection magnetic field for forming said image on said screen.

4. The horizontal size regulation circuit of claim 1, said voltage detector comprising:

a first transistor having a first electrically conducting electrode connected to a first power terminal via a first resistor and coupled to receive the voltage supplied to said switching element of said current controller, and having a second electrically conducting electrode connected to a second power terminal via a second resistor and having a control electrode connected to said second electrically conducting electrode of said first transistor; and a second transistor having a first electrically conducting electrode connected to said first power terminal via a third resistor, and having a second electrically conducting electrode connected to said second power terminal via a fourth resistor for providing a feedback voltage supplied to said horizontal size controller, and having a control electrode connected to said control electrode of said first transistor.

5. A display device, comprising:

a monitor including a deflection coil;

a power supply circuit for supplying a direct current voltage; and a horizontal deflection circuit including a horizontal oscillation circuit for forming a sawtooth waveform in accordance with a charging and discharging of a capacitor by using the direct current voltage supplied from said power supply circuit to thereby oscillate at a horizontal synchronizing frequency, a horizontal drive circuit for driving an output pulse of said horizontal oscillating circuit, a horizontal output circuit including a choke coil for generating an output current to the deflection coil in accordance with the output pulse driven by said horizontal drive circuit; and a horizontal size regulation circuit for regulating and maintaining a horizontal size of an image displayed on said monitor.

6. The display device of claim 5, said horizontal size regulation circuit comprising:

a horizontal size controller for controlling the horizontal size of said image displayed on said monitor;

a current controller for controlling current supplied from said horizontal size controller to said horizontal output circuit;

a voltage detector for detecting a voltage supplied to said current controller; and a feedback controller for controlling the amount of a feedback voltage supplied to said horizontal size controller, by filtering the voltage detected by said voltage detector.

7. The display device of claim 6, current supplied to said choke coil of said horizontal output circuit being controlled in accordance with an output signal of said current controller.

8. The display device of claim 6, said horizontal output circuit comprising:

said choke coil receiving current supplied from the current controller; and an output transistor having a base coupled to receive a horizontal drive signal and a collector connected to said choke coil for generating a horizontal deflection signal to cause the deflection coil to generate a horizontal deflection magnetic field for forming said image on said monitor.

9. The display device of claim 6, said voltage detector comprising:

a first transistor having a first electrically conducting electrode connected to a first power terminal via a first resistor and coupled to receive a voltage supplied to a switching element of said current controller, a second electrically conducting electrode connected to a second power terminal via a second resistor and having a control electrode connected to said second electrically conducting electrode of said first transistor; and a second transistor having a first electrically conducting electrode connected to said first power terminal via a third resistor, and having a second electrically conducting electrode connected to said second power terminal via a fourth resistor for providing a feedback voltage supplied to said horizontal size controller, and having a control electrode connected to said control electrode of said first transistor.

10. The display device of claim 8, said voltage detector comprising:

a first transistor having a first electrically conducting electrode connected to a first power terminal via a first resistor and coupled to receive the voltage supplied to said switching element of said current controller, and having a second electrically conducting electrode connected to a second power terminal via second resistor and having a control electrode connected to said second electrically conducting electrode of said first transistor; and a second transistor having a first electrically conducting electrode connected to said first power terminal via a third resistor, and having a second electrically conducting electrode connected to said second power terminal via a fourth resistor for providing a feedback voltage supplied to said horizontal size controller, and having a control electrode connected to said control electrode of said first transistor.

* * * * *